US007835864B1

(12) United States Patent
Oexmann

(10) Patent No.: US 7,835,864 B1
(45) **Date of Patent: *Nov. 16, 2010**

(54) VEHICLE PROXIMITY DETECTION AND CONTROL SYSTEMS

(75) Inventor: Dale F. Oexmann, c/o Autumn Glen Active Adult Community, 98 N. 10th St., Greencastle, IN (US) 46135

(73) Assignee: Dale F. Oexmann, Zionsville, IN (US)

( * ) Notice: Subject to any disclaimer, the term of this patent is extended or adjusted under 35 U.S.C. 154(b) by 130 days.

This patent is subject to a terminal disclaimer.

(21) Appl. No.: 12/043,545

(22) Filed: Mar. 6, 2008

Related U.S. Application Data

(63) Continuation of application No. 11/634,608, filed on Dec. 6, 2006, now abandoned, and a continuation of application No. 11/092,038, filed on Mar. 29, 2005, now abandoned, and a continuation of application No. 10/462,985, filed on Jun. 17, 2003, now Pat. No. 6,924,736, and a continuation of application No. 09/788,778, filed on Feb. 20, 2001, now abandoned.

(60) Provisional application No. 60/183,726, filed on Feb. 20, 2000.

(51) Int. Cl.
*G01C 21/00* (2006.01)

(52) U.S. Cl. .......................... 701/213

(58) Field of Classification Search ......... 701/213–216, 701/301–302; 340/435–436, 903, 988, 995.1, 340/995.25

See application file for complete search history.

(56) References Cited

U.S. PATENT DOCUMENTS

| | | | | |
|---|---|---|---|---|
| 6,924,736 | B2 * | 8/2005 | Oexmann et al. | 340/436 |
| 2007/0083309 | A1 * | 4/2007 | Danner et al. | 701/41 |
| 2008/0133136 | A1 * | 6/2008 | Breed et al. | 701/301 |

* cited by examiner

*Primary Examiner*—Kim T Nguyen
(74) *Attorney, Agent, or Firm*—Barnes & Thornburg LLP

(57) ABSTRACT

Multiple vehicles are each equipped with a global positioning system (GPS) and a plurality of accelerometers to provide information related to vehicle's current state. A controller is provided to predict concurrent presence of at least two of the vehicles at a location at some future time. At least one of the vehicles further includes an indicator to indicate the potential for concurrent presence at the location in adequate time for the operator of the at least one of the vehicles to take appropriate evasive action to avoid concurrent presence at the location.

6 Claims, 5 Drawing Sheets

VEHICLE PROXIMITY DETECTION AND CONTROL SYSTEMS

CROSS REFERENCE TO RELATED APPLICATIONS

This application is a continuation-in-part of U.S. Ser. No. 11/634,608, now abandoned. U.S. Ser. No. 11/634,608 is a continuation of U.S. Ser. No. 11/092,038, now abandoned. U.S. Ser. No. 11/092,038 is a continuation of U.S. Ser. No. 10/462,985, now U.S. Pat. No. 6,924,736. U.S. Ser. No. 10/462,985 is a continuation of U.S. Ser. No. 09/788,778, now abandoned. U.S. Ser. No. 09/788,778 claims the benefit of U.S. Ser. No. 60/183,726 filed on Feb. 20, 2000. The disclosures of all of U.S. Ser. No. 11/634,608, U.S. Ser. No. 11/092,038, U.S. Ser. No. 10/462,985, U.S. Ser. No. 09/788,778 and U.S. Ser. No. 60/183,726 are hereby incorporated herein in their entireties by reference.

FIELD OF THE INVENTION

This invention relates to vehicle proximity detection and control systems. It is disclosed in the context of systems for detecting potential concurrent location of multiple vehicles, systems for adaptive control of vehicle speeds and systems for control of traffic flow through an intersection. However, it is believed to be useful in other applications as well.

DISCLOSURE OF THE INVENTION

According to an aspect of the invention, multiple vehicles are each equipped with a global positioning system (GPS) and a plurality of accelerometers to provide information related to said vehicle's current state. A controller is provided to predict concurrent presence of at least two of said vehicles at a location at some future time. At least one of said vehicles further includes an indicator, for example, an audible and/or visual indicator, to indicate the potential for concurrent presence at said location in adequate time for the operator of said at least one of said vehicles to take appropriate evasive action to avoid concurrent presence at said location.

Illustratively according to this aspect of the invention, each of the multiple vehicles is equipped with three accelerometers.

According to another aspect of the invention, multiple vehicles are each equipped with a global positioning system (GPS) and a plurality of accelerometers to provide information related to said vehicle's current state, a controller to identify vehicle speed, and an interface between the controller and said vehicle's throttle to control acceleration and deceleration.

Illustratively according to this aspect of the invention, the controller comprises a controller for maintaining a substantially constant distance behind a vehicle immediately ahead of said vehicle.

Illustratively according to this aspect of the invention, the controller comprises a controller for maintaining a substantially constant distance behind a vehicle immediately ahead of said vehicle depending at least in part on the speed of said vehicle.

Illustratively according to this aspect of the invention, the controller comprises a controller for preventing said vehicle from exceeding a preset value.

According to another aspect of the invention, multiple vehicles are each equipped with a global positioning system (GPS) to provide information related to said vehicle's current state and a transceiver. A controller is provided for controlling traffic flow through an intersection during periods when traffic flow through said intersection is below a predetermined threshold. The controller includes a transmitter for communicating with the transceiver in each said vehicle.

Illustratively according to this aspect of the invention, said controller comprises a controller for controlling traffic flow using historical time of day (TOD) traffic flow rates.

Illustratively according to this aspect of the invention, said controller comprises a controller for controlling traffic flow using current arrivals at the intersection.

Illustratively according to this aspect of the invention, said controller further comprises a controller for giving preference to a first direction of traffic flow at a first time of day and to a second and different direction of traffic flow at a second time of day.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

Figure 1:
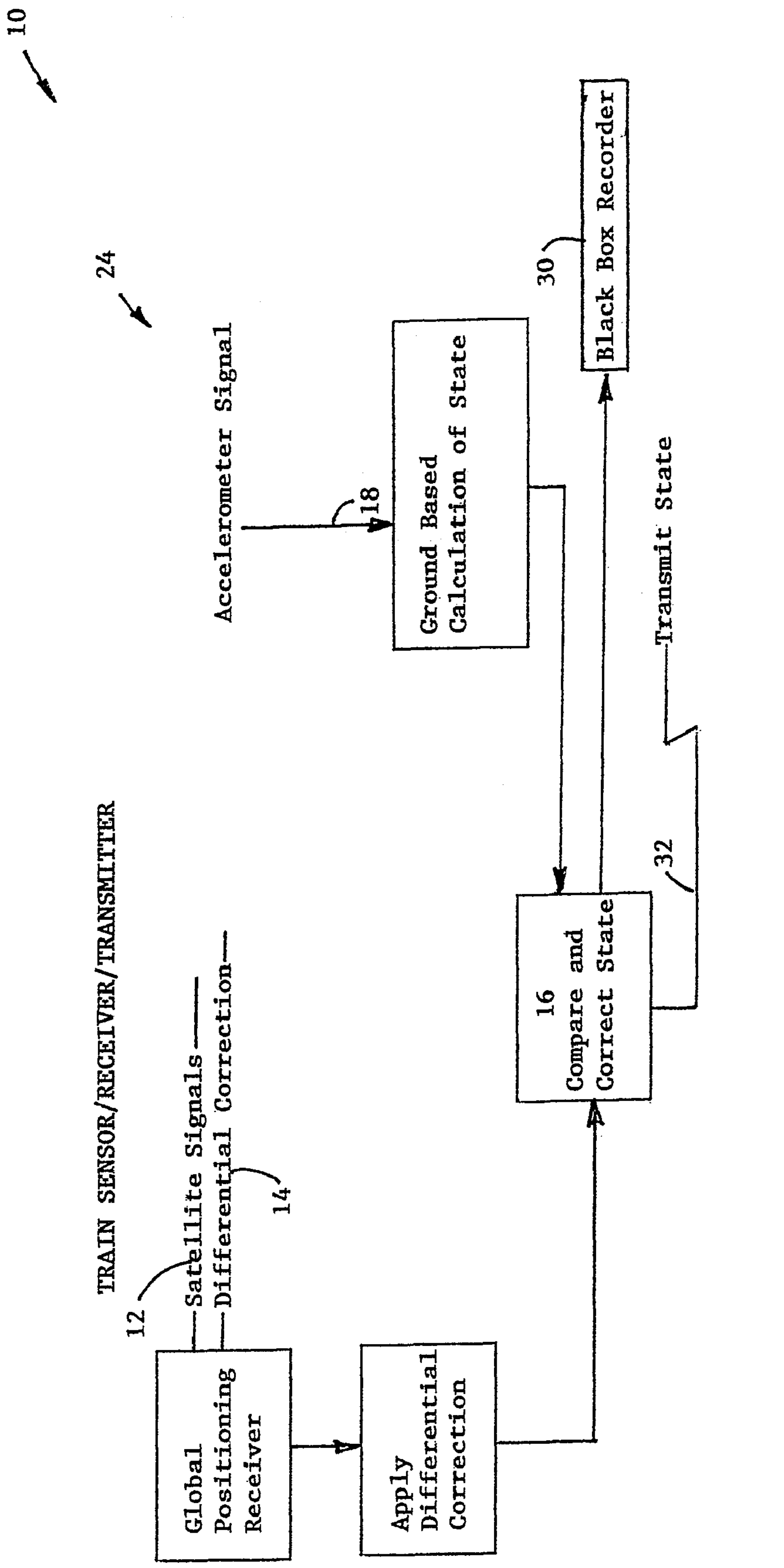
FIG. 1 illustrates a partly block and partly flow diagram for a component constructed according to the invention.

Referring now to FIG. 1, a system 10 provides a warning to vehicles traveling toward a railroad crossing of impending danger from a train either blocking the crossing or close enough to the crossing that there is a danger of collision. The positions, speeds and directions of travel of both the vehicle and train are determined using Global Positioning System (GPS) signals 12 and corrections from Differential Global Positioning Satellite (DGPS) signals 14 are used to calculate the distance between the two vehicles as well as project their arrival at the crossing. This information is further compared and corrected 16 by calculated position and velocity, using data 18 from accelerometer sensors on the vehicle and train.

The vehicle/train state can be one of the following: no known train within receiving distance of a receiver in the vehicle; a train has been detected within range of the receiver; the train and vehicle are both approaching the crossing at such a rate that, from their current positions, if they continue there is danger of collision; the train and vehicle are both approaching the crossing at such a rate that, from their current positions, if they continue a collision is practically certain; and, interference is such that no reliable signal can be received from the satellite or train on a timely basis.

Audible 20 or visual 22 indication, or both, of the above states can be provided.

The system 10 is not intended to replace the existing light and crossing gates in place at some crossings.

There are three major communicating components to the system 10. Referring to FIG. 1, the first is a Train Sensor/Receiver/Transmitter (TSRT) 24. One of these will be placed on a car or engine at each end of the train. Referring to FIG.

Figure 3:
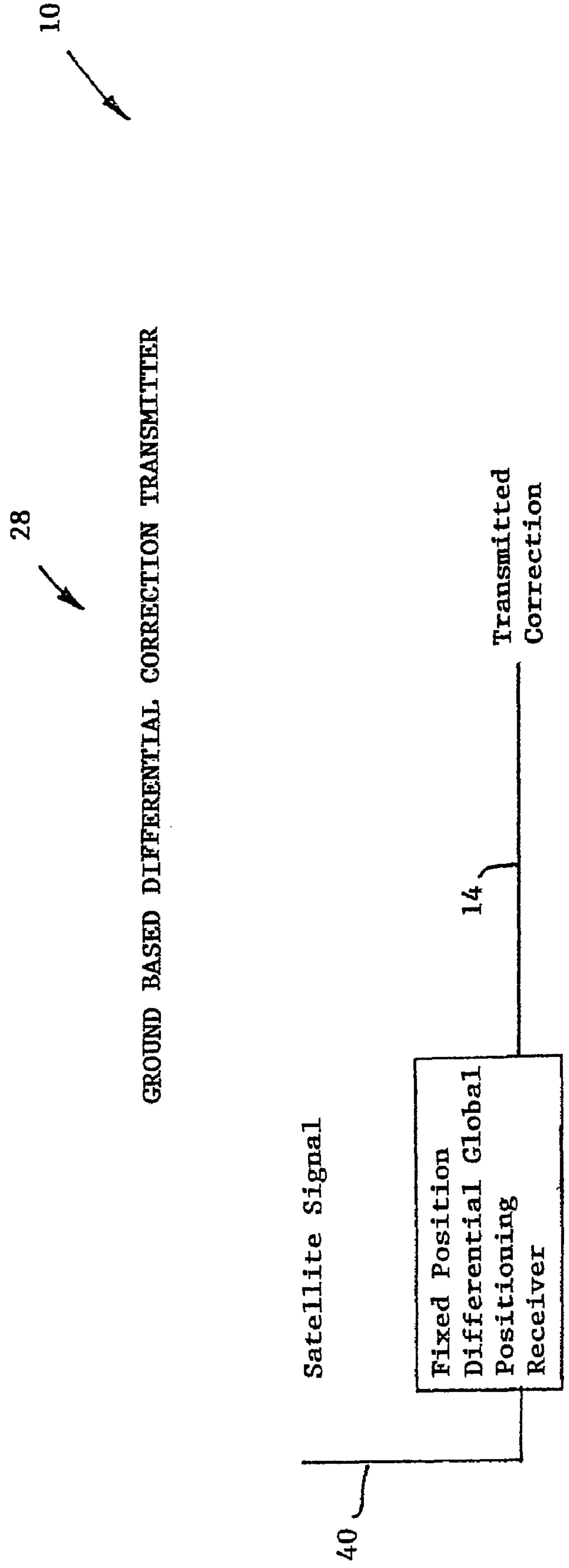
FIG. 3 illustrates a partly block and partly flow diagram for a component constructed according to the invention.

2, the second component is a Vehicle Sensor/Receiver (VSR) 26. One of these will be placed on each road vehicle. Referring to FIG. 3, the optional third component is a Ground-Based Differential Correction Receiver/Transmitter (GBDCR) 28. These will be positioned so that at any time each train and vehicle will be close enough to at least one, so that the train and vehicle can receive the correction signal.

Referring back to FIG. 1, the TSRT 24 receives GPS satellite signals 12, receives differential GPS correction 14 when the GPS signal is scrambled, and calculates 16 at least one of, and illustratively all of, time, position and velocity based on this input. The TSRT 24 maintains a separate time and/or position and/or velocity based on a processor time and an onboard signal 18 from an accelerometer, compares and computes 16 a corrected time and/or position and/or velocity based on both. The TSRT 24 further records 30 the current state, time and/or position and/or velocity to a black box for a permanent log on the train and vehicle. The TSRT 24 also broadcasts 32 a transmission, for example, a digital transmission, of this state to be received and processed by any vehicle equipped with a VSR 26.

Figure 2:
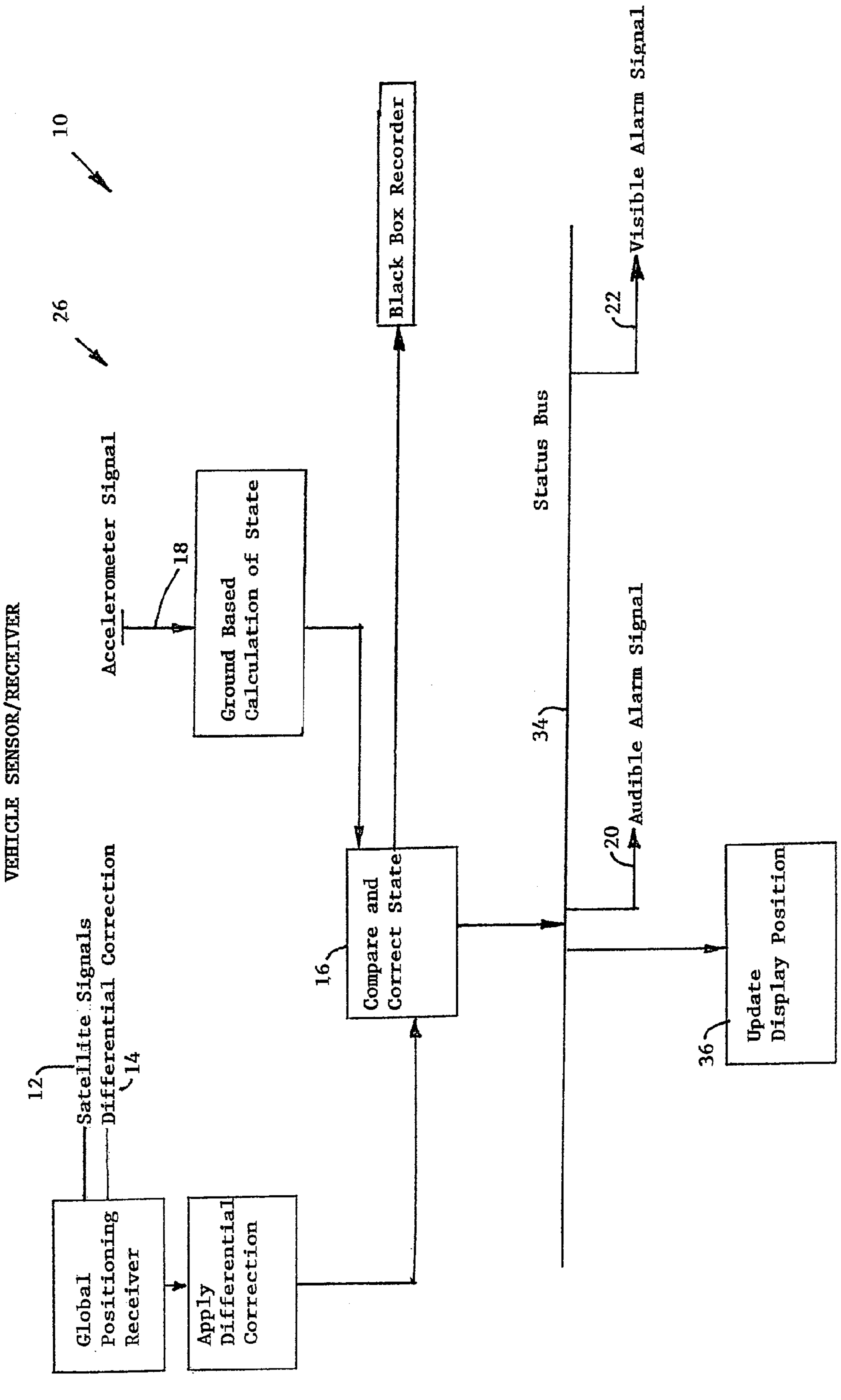
FIG. 2 illustrates a partly block and partly flow diagram for a component constructed according to the invention.

Referring back to FIG. 2, the VSR 26 receives GPS satellite signals 12, receives differential GPS correction 14 when the GPS signal is scrambled, and calculates 16 time and/or position and/or velocity based on this input. The VSR 26 maintains a separate time and/or position and/or velocity based on a processor time and an onboard signal from an accelerometer 18. The VSR 26 compares and computes 16 a corrected time and/or position and/or velocity based on both the GPS-calculated time and the onboard accelerometer 18-based time. The VSR 26 records 30 the current state, time and/or position and/or velocity to a black box for a permanent log. The VSR 26 determines the current status, vehicle time and/or position and/or velocity, and the train time and/or position and/or velocity. The VSR 26 maintains this vehicle/train state on its system bus 34 in order to provide to warning devices the information needed to provide the appropriate warning. The VSR 26 maintains the current train state and vehicle state on the system bus 34 to be used by a display 36 processor. The display 36 processor presents a map with the surrounding roadway, train track and intersection, marking the current position(s) of train(s) and/or vehicle(s). It should be understood that many road vehicles are already equipped with GPS receivers. In such cases, all that would need to be provided is an output from the existing GPS receiver to the VSR 26.

Referring again to FIG. 3, if the GPS signal is scrambled, the GBDCR 28 receives differential correction signals 40 from the satellite, and relays corrections 14 to all trains and vehicles equipped with a TSRT 24 or VSR 26 by broadcast.

It is contemplated that part of the vehicle state that is transmitted will be the vehicle's identity, for example, the VIN number or some other unique identification.

Although the invention has been presented in the context of a system for avoiding collisions between trains and road vehicles, it is clear that the same components can be used on any two or more trains or other vehicles to avoid collisions between them. Each participating vehicle needs both components, the TSRT 24 and the VSR 26. Since the two components 24, 26 share some functionality, integrating them into a single component is a reasonable approach to satisfying their requirements.

Examples of such uses in vehicle-to-vehicle collision avoidance systems include, but are not limited to: use on emergency vehicles, such as ambulances and fire trucks, and other vehicles to warn the other vehicles of the proximity of emergency vehicles; use on two vehicle traveling the same route in the same direction in low visibility conditions, such as fog, rain or snow, to warn of proximity; and for identification of congestion caused by road construction, accidents or the like.

Figure 4:
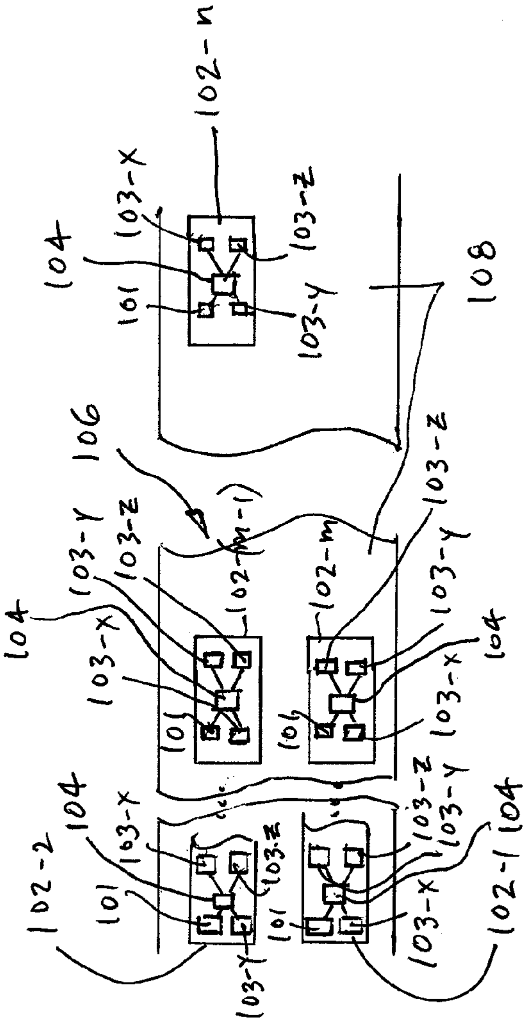
FIG. 4 illustrates a partly block and partly flow diagram for a component constructed according to the invention.

Referring now to FIG. 4, the described system 100 does not rely on line of sight, but rather on two independent devices, a GPS 101 and accelerometers 103 (in the illustrated embodiments, three accelerometers 103-*x*, 103-*y*, 103-*z*) to determine a vehicle 102-1, 102-2, . . . 's current state, within acceptable limits. In an embodiment, all vehicles 102-1, 102-2, . . . are equipped with such systems. Functionality is added to the controller 104 of each system 100 to recognize, for example, obstruction 106 of all lanes of a highway 108, well before the obstruction 106 can be seen. This permits a driver of a vehicle 102-*n* approaching such an obstruction 106 to avoid a collision with one or more of the backed-up vehicles 102-1, 102-2, . . . obstructing all lanes. The driver of vehicle 102-*n* will be warned in adequate time to take appropriate action.

Figure 5:
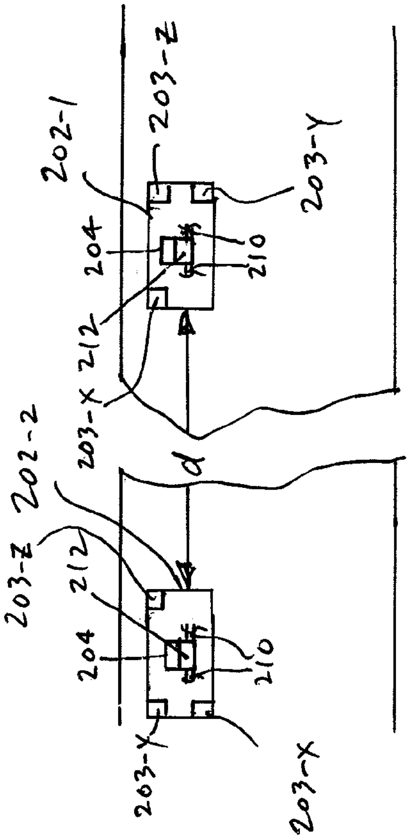
FIG. 5 illustrates a partly block and partly flow diagram for a component constructed according to the invention; and, FIG. 6 illustrates a partly block and partly flow diagram for a component constructed according to the invention.

Referring now to FIG. 5, in another embodiment, each vehicle is equipped with GPS 201 and accelerometers 203-*x*, 203-*y*, 203-*z*. Additional functionality is provided for the controller 204, and the linkage 210 controlling vehicle 202-1 speed is interfaced 212 with the controller 204, so that the controller 204 can effectively control vehicle 202-1 acceleration and deceleration. The resulting control provides an adaptive cruise control (hereinafter sometimes ACC). The present embodiment keeps to a minimum the additional hardware required to implement ACC. Adding code to the controller 204 (which in the case of most land vehicles includes a real-time or quasi-real time microprocessor) and an output to the interface 212 to control the vehicle 202-1's speed and maintain a constant distance d behind a vehicle 202-2 immediately ahead, depending on speed, while preventing acceleration beyond the speed limit or a preset value, is a much more economical implementation of ACC.

Figure 6:
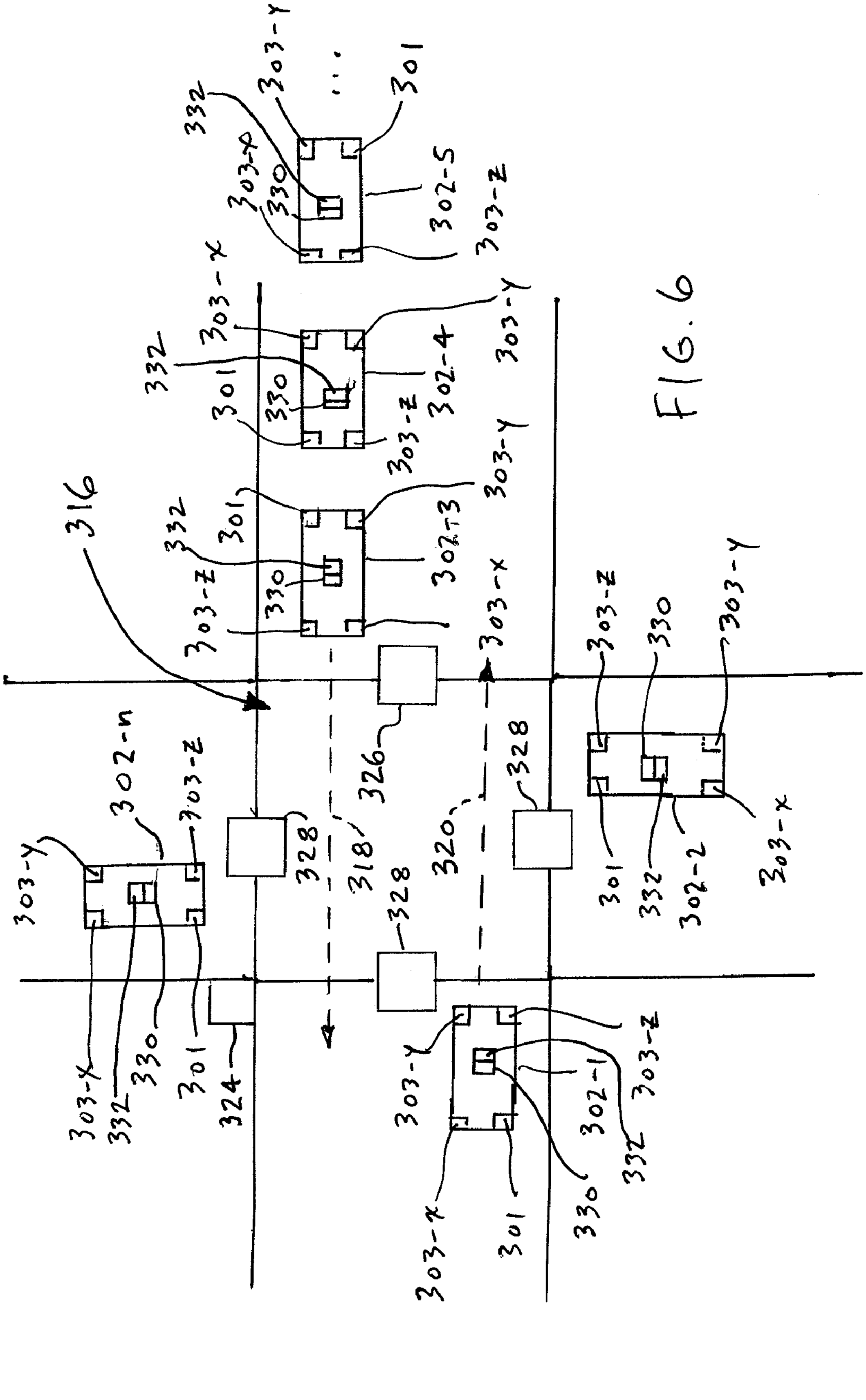

Referring now to FIG. 6, in another embodiment, each vehicle 302-1, 302-2, . . . is equipped with GPS 301 and accelerometers 303-*x*, 303-*y*, 303-*z*. Smooth flow of vehicles 302-1, 302-2, . . . is maintained through an intersection 316 without stopping while the throughput is slow enough. This results in less total time idling at the intersection 316 for an optimum number of vehicles 302-1, 302-2, . . . . This results in less fuel usage and shortens commuting times. Using historical time of day (hereinafter sometimes TOD) traffic flow rates and currently observed arrivals at the intersection 316, the system adapts. The flow algorithm may be biased, for example, to give precedence in the direction of primary traffic flow, for example, inbound 318 to a city center during the morning hours, and outbound 320 toward suburban areas during the evening hours. When traffic reaches a threshold level, such as during rush hours, control is returned to standard traffic light 322 timing and vehicle 302-1, 302-2, . . . operators. The hardware may be as simple as a controller 324 at the intersection 316 plus a flashing yellow traffic light 326 in the direction of precedence and flashing red traffic lights 328 in other directions, or it may be more complex. Vehicles 302-1, 302-2, . . . have installed GPS enabled receivers 330 and transceivers 332 to communicate with the controller 324 at the intersection.

What is claimed is:

1. A system, respective devices of which are adapted to be mounted in a first vehicle and in a second vehicle, for controlling the relative velocity of the first vehicle with respect to the second vehicle, the first vehicle including a first device for receiving first global positioning system (GPS) signals, generating at least one of a first time, position and velocity signal based on the received first GPS signals, generating at least one of a second time, position and velocity signal based upon the motion of the first vehicle, comparing the first and second signals, generating a corrected first vehicle signal, and the second vehicle including a second device for receiving second GPS signals, generating at least one of a third time, position and velocity signal based on the received second GPS signals, generating at least one of a fourth time, position and velocity signal based on the motion of the second vehicle, comparing the third and fourth signals, generating a corrected second vehicle signal, and transmitting the corrected second vehicle signal, the first device further being coupled to a speed control of the first vehicle to control the speed of the first vehicle, the first device further receiving the corrected second vehicle signal, and, from the corrected first vehicle signal and the corrected second vehicle signal controlling the speed of the first vehicle to reduce the likelihood of coincidence of the first and second vehicles.

2. The system of claim 1 further including a third device for receiving differential GPS (DGPS) correction signals and retransmitting the DGPS correction signals, the first device receiving the DGPS correction signals and combining the DGPS correction signals with the first GPS signals to generate the at least one of the first time, position and velocity signal.

3. The system of claim 2 wherein the second device receives the DGPS correction signals and combines the DGPS correction signals with the second GPS signals to generate the at least one of the third time, position and velocity signal.

4. The system of claim 1 further including a third device for receiving differential GPS correction signals and retransmitting the DGPS correction signals, the second device receiving the DGPS correction signals and combining the DGPS correction signals with the second GPS signals to generate the at least one of the third time, position and velocity signal.

5. The system of claim 1 wherein the first device adjusts a desired distance between the first and second vehicles depending on the velocity of the first vehicle or the velocity of the second vehicle.

6. The system of claim 1 wherein the first device will not adjust a speed of the first vehicle above a preset limit.

* * * * *